United States Patent
McDaniel et al.

(10) Patent No.: US 11,384,171 B2
(45) Date of Patent: *Jul. 12, 2022

(54) SURFACTANT AS TITANATION LIGAND

(71) Applicant: Chevron Phillips Chemical Company LP, The Woodlands, TX (US)

(72) Inventors: Max P. McDaniel, Bartlesville, OK (US); Kathy S. Clear, Bartlesville, OK (US); William C. Ellis, Bartlesville, OK (US); Deloris R. Gagan, Ramona, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/473,353

(22) Filed: Sep. 13, 2021

(65) Prior Publication Data

US 2021/0403616 A1    Dec. 30, 2021

Related U.S. Application Data

(60) Division of application No. 17/090,590, filed on Nov. 5, 2020, which is a continuation of application No. 16/439,078, filed on Jun. 12, 2019, now Pat. No. 10,889,664.

(51) Int. Cl.
```
C08F 4/76      (2006.01)
C08F 4/02      (2006.01)
C08F 4/78      (2006.01)
```

(52) U.S. Cl.
CPC ............ *C08F 4/76* (2013.01); *C08F 4/02* (2013.01); *C08F 4/78* (2013.01)

(58) Field of Classification Search
CPC ...... C08F 4/02; C08F 4/76; C08F 4/78; C08F 4/24; C08F 4/025; C08F 10/00; C08F 4/61916; C08F 4/16; C08F 4/00; B01J 2531/62; B01J 2531/46; B01J 2531/122; B01J 31/223; B01J 31/2239; B01J 31/2234; B01J 31/0209; B01J 31/0212; B01J 31/04; B01J 31/31; B01J 31/34

See application file for complete search history.

(56) References Cited

U.S. PATENT DOCUMENTS

| | | |
|---|---|---|
| 3,248,179 A | 4/1966 | Norwood |
| 4,169,926 A | 10/1979 | McDaniel |
| 4,296,001 A | 10/1981 | Hawley |
| 4,368,303 A | 1/1983 | McDaniel |
| 4,501,885 A | 2/1985 | Sherk |
| 4,588,790 A | 5/1986 | Jenkins, III |
| 5,352,749 A | 10/1994 | Dechellis |
| 5,436,304 A | 7/1995 | Griffin |
| 5,455,314 A | 10/1995 | Burns |
| 5,565,175 A | 10/1996 | Hottovy |
| 5,575,979 A | 11/1996 | Hanson |
| 6,239,235 B1 | 5/2001 | Hottovy |
| 6,262,191 B1 | 7/2001 | Hottovy |
| 6,312,685 B1 | 11/2001 | Fisher |
| 6,833,415 B2 | 12/2004 | Kendrick |
| 7,534,293 B2 | 5/2009 | Hong |
| 7,700,516 B2 | 4/2010 | McDaniel et al. |
| 9,587,048 B2 | 3/2017 | Praetorius |
| 9,988,468 B2 | 6/2018 | Mcdaniel |
| 10,213,766 B2 | 2/2019 | Praetorius |
| 10,287,369 B2 | 5/2019 | Schwerdtfeger |
| 10,323,109 B2 | 6/2019 | Mcdaniel |
| 10,523,870 B2 | 12/2019 | Danielsen |
| 10,543,480 B2 | 1/2020 | Mcdaniel |
| 10,669,362 B2 | 6/2020 | Mcdaniel |
| 10,722,874 B2 | 7/2020 | Mcdaniel |
| 10,858,456 B1 | 12/2020 | Mcdaniel |
| 10,858,460 B2 | 12/2020 | Mcdaniel |
| 10,889,664 B2 | 1/2021 | Mcdaniel |
| 10,894,249 B2 | 1/2021 | Mcdaniel |
| 10,894,250 B2 | 1/2021 | Mcdaniel |
| 2019/0134610 A1 | 5/2019 | Praetorius |
| 2019/0204075 A1 | 7/2019 | Chen |
| 2019/0314797 A1* | 10/2019 | McDaniel ............ B01J 35/1019 |

(Continued)

FOREIGN PATENT DOCUMENTS

EP    2606962 A1    6/2013

OTHER PUBLICATIONS

Definition of Amphiphilic—https://www.merriam-webster.com/dictionary/amphiphilic.
U.S. Appl. No. 14/858,512, filed Sep. 18, 2015, U.S. Pat. No. 10,213,766, Feb. 26, 2019.
U.S. Appl. No. 16/237,011, filed Dec. 31, 2018, 2019/0134610, May 9, 2019.
U.S. Appl. No. 15/495,116, filed Apr. 24, 2017, U.S. Pat. No. 10,287,369, May 14, 2019.

(Continued)

*Primary Examiner* — Smita S Patel

(74) *Attorney, Agent, or Firm* — Conley Rose, P.C.

(57) ABSTRACT

A pre-catalyst composition comprising: a) a silica support comprising silica wherein an amount of silica is in a range of from about 70 wt. % to about 95 wt. % based upon a total weight of the silica support; b) a titanium-containing compound wherein an amount of titanium is in a range of from about 0.1 wt. % to about 10 wt. % based upon the total weight of the silica support; c) a chromium-containing compound wherein an amount of chromium is in a range of from about 0.1 wt. % to about 10 wt. % based upon the total weight of the silica support; d) a surfactant wherein the surfactant comprises a non-ionic surfactant, a cationic surfactant, or a combination thereof, e) a carboxylate wherein the carboxylate comprises a multi carboxylate, an alpha-hydroxy carboxylate, or a combination thereof, and f) a solvent.

21 Claims, No Drawings

(56) References Cited

U.S. PATENT DOCUMENTS

2020/0010587 A1 1/2020 Mcdaniel
2020/0164351 A1 5/2020 Mcdaniel

OTHER PUBLICATIONS

U.S. Appl. No. 15/816,131, filed Nov. 17, 2017, U.S. Pat. No. 10,323,109, Jun. 18, 2019.
U.S. Appl. No. 16/387,199, filed Apr. 17, 2019, U.S. Pat. No. 10,669,362, Jun. 2, 2020.
U.S. Appl. No. 16/863,243, filed Apr. 30, 2020, U.S. Pat. No. 10,858,460, Dec. 8, 2020.
U.S. Appl. No. 17/075,515, filed Oct. 20, 2020.
U.S. Appl. No. 15/816,145, filed Nov. 17, 2017, U.S. Pat. No. 10,513,570, Dec. 24, 2019.
U.S. Appl. No. 16/571,281, filed Sep. 16, 2019, 2020/0010587, Jan. 9, 2020.
U.S. Appl. No. 15/953,927, filed Apr. 16, 2018, 2019/0204075, Oct. 17, 2019.
U.S. Appl. No. 15/953,930, filed Apr. 16, 2018, U.S. Pat. No. 10,543,480, Jan. 28, 2020.
U.S. Appl. No. 16/711,304, filed Dec. 11, 2019, 2020/0164351, May 28, 2020.
U.S. Appl. No. 16/774,891, filed Jan. 28, 2020, U.S. Pat. No. 10,722,874, Jul. 28, 2020.
U.S. Appl. No. 16/907,801, filed Jun. 22, 2020, U.S. Pat. No. 10,894,249, Jan. 19, 2021.
U.S. Appl. No. 16/987,128, filed Aug. 6, 2020, U.S. Pat. No. 10,894,250, Jan. 19, 2021.
U.S. Appl. No. 17/135,392, filed Dec. 28, 2020.
U.S. Appl. No. 17/135,401, filed Dec. 28, 2020.
U.S. Appl. No. 16/439,067, filed Jun. 12, 2019.
U.S. Appl. No. 16/861,705, filed Apr. 29, 2020.
U.S. Appl. No. 16/439,074, filed Jun. 12, 2019, U.S. Pat. No. 10,858,456, Dec. 8, 2020.
U.S. Appl. No. 16/861,486, filed Apr. 29, 2020.

* cited by examiner

SURFACTANT AS TITANATION LIGAND

CROSS-REFERENCE TO RELATED APPLICATIONS

The present application is a divisional application of and claims priority to U.S. patent application Ser. No. 17/090,590 filed Nov. 5, 2020 and published as U.S. Patent Application Publication No. 2021/0054112A1, which is a continuation of and claims priority to U.S. patent application Ser. No. 16/439,078 filed Jun. 12, 2019, now U.S. Pat. No. 10,889,664 B2, both entitled "Surfactant as Titanation Ligand," both of which applications are incorporated by reference herein in their entirety.

TECHNICAL FIELD

The present disclosure relates to catalyst compositions. More specifically, the present disclosure relates to methods of preparing olefin polymerization catalyst compositions and polymers prepared from same.

BACKGROUND

An economically important class of olefin polymerization catalysts includes chromium-silica-titanium (Cr/Si—Ti) catalysts prepared from silica-based catalyst supports. Rigorous drying of the water-sensitive catalyst components used to produce Cr/Si—Ti catalysts increases the time and cost of production. Development of an aqueous solution suitable for depositing titanium onto a silica-based catalyst support would reduce the costs of production of olefin polymerization catalysts. Thus, there is an ongoing need to develop new methods of producing olefin polymerization catalysts.

SUMMARY

Disclosed herein is a method comprising contacting a silica support with a titanium-containing solution to form a titanated silica support, wherein the titanium-containing solution comprises a titanium compound, a solvent, and a surfactant.

While the subject matter disclosed herein is susceptible to various modifications and alternative forms, only a few specific aspects have been shown by way of example and are described below in detail. The detailed descriptions of these specific aspects are not intended to limit the breadth or scope of the subject matter disclosed or the appended claims in any manner. Rather, the detailed written descriptions are provided to illustrate the present disclosure to a person skilled in the art and to enable such person to make and use the concepts disclosed herein.

DETAILED DESCRIPTION

The present disclosure encompasses olefin polymerization catalysts and pre-catalyst compositions thereof, methods of preparing olefin polymerization catalysts and pre-catalyst compositions thereof, and methods of utilizing olefin polymerization catalysts. In an aspect, a method of the present disclosure comprises contacting a silica support or a chromium-silica support (i.e., support) with titanium to produce a Cr/Si—Ti catalyst. The methodologies disclosed herein contemplate the use of a titanium-containing solution (e.g., an aqueous titanium solution (ATS)) to facilitate the association of titanium with the support (e.g., in the presence of water). In an aspect, a methodology for preparation of the olefin polymerization catalyst comprises contacting a chromium-silica support with the titanium-containing solution (e.g., ATS) under conditions suitable to form a pre-catalyst composition and further processing the pre-catalyst composition to produce a Cr/Si—Ti catalyst. In an alternative aspect, a methodology for preparation of the olefin polymerization catalyst comprises contacting (e.g., simultaneously or sequentially) a silica support with the titanium-containing solution and a chromium-containing compound (e.g., an ATS further comprising a chromium-containing compound) under conditions suitable to form a pre-catalyst composition and further processing the pre-catalyst composition to produce a Cr/Si—Ti catalyst. While these aspects may be disclosed under a particular heading, the heading does not limit the disclosure found therein. Additionally, the various aspects disclosed herein can be combined in any manner.

It has been surprisingly discovered that surfactants can be utilized as ligands for titanium (e.g., via addition of one or more surfactants to the titanium-containing solution (e.g., ATS), and that the surfactants aid in effective titanation of the silica support. Although non-ionic surfactants can be particularly effective, cationic and anionic surfactants can also work as ligands for titanium according to this disclosure.

Aspects of the present disclosure are directed to catalyst compositions and pre-catalyst compositions. In an aspect, a catalyst composition comprises an olefin polymerization catalyst (e.g., a Cr/Si—Ti catalyst). In a further aspect, the olefin polymerization catalyst comprises a treated pre-catalyst composition. In yet a further aspect, the treated pre-catalyst composition comprises a pre-catalyst composition that has been subjected to an activation treatment (e.g., calcination, optionally subsequent to drying) as disclosed herein.

Disclosed herein are methods of making pre-catalyst compositions and pre-catalyst compositions made thereby. In an aspect, a method of making a pre-catalyst composition in accordance with the present disclosure comprises: forming a titanated silica support via contact of a silica support (e.g., a silica support or a chrominated silica support) with an titanium-containing solution (e.g., ATS) formed by dissolving a titanium-containing compound (also referred to herein as a "titanium compound") in a solvent (e.g., an aqueous solution to yield an ATS) comprising a surfactant and optionally a carboxylate, wherein the carboxylate (when present) comprises a multi-carboxylate, an alpha-hydroxy carboxylate, or a combination thereof, drying the titanated support to form a dried titanated support; and adding chromium by (a) using a chrominated silica support as a starting material, (b) adding a chromium-containing compound to the titanium-containing solution (e.g., ATS), and/or (c) contacting (i) the silica support, (ii) the titanated silica support, (iii) the dried titanated support, or (iv) a combination thereof with a chromium-containing compound (also referred to herein as a "chromium compound") to form the pre-catalyst composition. In aspects (for example, where the titanium precipitates upon contact of the titanium-containing compound with water), the titanium-containing solution can further comprise a carboxylate comprising a multi-carboxylate, an alpha-hydroxy carboxylate, or a combination thereof to aid in dissolving the solid titanium. The pre-catalyst composition may be further processed (e.g., dried and calcined) to form a catalyst (e.g., a Cr/Si—Ti catalyst).

In an aspect, a method of forming a pre-catalyst composition or catalyst in accordance with the present disclosure comprises contacting a silica support (e.g., a silica support or a chrominated silica support) with an aqueous titanium solution (ATS) formed by dissolving a titanium compound in an aqueous solution comprising a surfactant. In aspects (for example, where the titanium precipitates upon contact of the titanium-containing compound with water), the ATS can further comprise a carboxylate comprising a multi-carboxylate, an alpha-hydroxy carboxylate, or a combination thereof to aid in dissolving the solid titanium. In aspects, the ATS further comprises a chromium-containing compound. The pre-catalyst composition may be further processed (e.g., dried and calcined) to form a catalyst (e.g., a Cr/Si—Ti catalyst).

In an aspect, a method in accordance with the present disclosure comprises contacting a silica support with a titanium-containing solution to form a titanated silica support, wherein the titanium-containing solution comprises a titanium compound, a chromium-containing compound, a solvent, optionally a carboxylate (e.g., a multi carboxylate, an alpha-hydroxy carboxylate, or a combination thereof), and a surfactant, wherein the silica support is selected from the group consisting of a silica xerogel (e.g., a dried silica xerogel), a silica hydrogel (e.g., a dried silica hydrogel), solid silica (e.g., crystalline silicon dioxide), solid silica-alumina, and combinations thereof. The method can further comprise drying the titanated silica support (e.g., by heating the titanated silica support to a temperature in a range of from about 50° C. to about 200° C. and maintaining the temperature of the titanated silica support in the range of from about 50° C. to about 200° C. for a time period of from about 30 minutes to about 6 hours) to form a pre-catalyst composition. The method may further comprise calcining the pre-catalyst (e.g., by heating the pre-catalyst in a reducing atmosphere to a temperature in a range of from about 400° C. to about 1000° C. and maintaining the temperature of the pre-catalyst in the range of from about 400° C. to about 1000° C. for a time period of from about 1 minute to about 24 hours) to form a catalyst (e.g., a Cr/Si—Ti catalyst suitable for olefin polymerization).

In an aspect, a method in accordance with the present disclosure comprises contacting a chrominated silica support with a aqueous titanium solution to form a titanated, chrominated silica support, wherein the aqueous titanium solution comprises water, a titanium compound, optionally a carboxylic acid, and a surfactant; drying the chrominated, titanated silica support (e.g., by heating the chrominated, titanated silica support to a temperature in a range of from about 50° C. to about 200° C. and maintaining the temperature of the chrominated, titanated silica support in the range of from about 50° C. to about 200° C. for a time period of from about 30 minutes to about 6 hours) to form a pre-catalyst; and calcining the pre-catalyst (e.g., by heating the pre-catalyst in a reducing atmosphere (e.g., in the presence of oxygen) to a temperature in a range of from about 400° C. to about 1000° C. and maintaining the temperature of the pre-catalyst in the range of from about 400° C. to about 1000° C. for a time period of from about 1 minute to about 24 hours) to form a catalyst. In an aspect, the aqueous titanium solution can be prepared by (i) preparing a first solution by combining the carboxylic acid (e.g., oxalic acid) and water; (ii) adding the titanium compound (e.g., titanium isopropoxide) to the first solution to form a second solution, and (iii) adding the surfactant to the second solution to form the aqueous titanium solution.

In an aspect, a method in accordance with the present disclosure comprises contacting a silica support with a aqueous titanium solution to form a titanated, chrominated silica support, wherein the aqueous titanium solution comprises water, a titanium compound, a chromium-containing compound, optionally a carboxylic acid, and a surfactant; drying the chrominated, titanated silica support (e.g., by heating the chrominated, titanated silica support to a temperature in a range of from about 50° C. to about 200° C. and maintaining the temperature of the chrominated, titanated silica support in the range of from about 50° C. to about 200° C. for a time period of from about 30 minutes to about 6 hours) to form a pre-catalyst; and calcining the pre-catalyst (e.g., by heating the pre-catalyst in a reducing atmosphere (e.g., in the presence of oxygen) to a temperature in a range of from about 400° C. to about 1000° C. and maintaining the temperature of the pre-catalyst in the range of from about 400° C. to about 1000° C. for a time period of from about 1 minute to about 24 hours) to form a catalyst. In an aspect, the aqueous titanium solution can be prepared by contacting the components thereof in any order (e.g., simultaneously or sequentially). In an aspect, the aqueous titanium solution can be prepared by (i) preparing a first solution by combining the carboxylic acid (e.g., oxalic acid) and water; (ii) adding the titanium compound (e.g., titanium isopropoxide) and the chromium-containing compound to the first solution to form a second solution, and (iii) adding the surfactant to the second solution to form the aqueous titanium solution.

The source of titanium to be incorporated into the titanium-containing solution (e.g., an ATS) may be any titanium compound capable of providing a sufficient amount of titanium to the olefin polymerization catalyst and the pre-catalyst composition thereof. In a further aspect, the titanium-containing compound comprises a tetravalent titanium (Ti(IV)) compound or a trivalent titanium (Ti(III)) compound. The Ti(IV) compound may be any compound that comprises Ti(IV); alternatively, the Ti(IV) compound may be any compound that is able to release a Ti(IV) species upon dissolving into the solvent to form the titanium-containing solution (e.g., ATS). The Ti(III) compound may be any compound that comprises Ti(III); alternatively, the Ti(III) compound may be any compound that is able to release a Ti(III) species upon dissolving into the solvent to form the titanium-containing solution (e.g., ATS). In an aspect the titanium compound is a Ti(IV) compound that hydrolyzes upon contact with an aqueous solution to yield hydrated titania (e.g., as freshly precipitated titania in the aqueous solution that can be further dissolved by inclusion of a carboxylate (e.g., carboxylic acid) in the aqueous solution as shown in the Examples below). In an aspect the titanium compound is a Ti(IV) compound that hydrolyzes upon contact with an aqueous solution to yield hydrated titania is a titanium alkoxide.

In an aspect, the titanium-containing compound suitable for use in the titanium-containing solution (e.g., ATS) of the present disclosure comprises a titanium alkoxide. In aspects, the titanium-containing compound comprises a Ti(IV) compound comprising at least one alkoxide group; or alternatively, at least two alkoxide groups. Ti(IV) compounds suitable for use in the present disclosure include, but are not limited to, Ti(IV) compounds that have the general formula $Ti(OR)_4$, $TiO(OR)_2$, $Ti(OR)_2(acac)_2$, $Ti(OR)_2(oxal)$, or a combination thereof, wherein each R is independently ethyl, isopropyl, n-propyl, isobutyl, or n-butyl; "acac" is acetylacetonate; and "oxal" is oxalate. Alternatively, the titanium-containing compound comprises a titanium(IV) alkoxide. In an aspect, the titanium(IV) alkoxide can be titanium(IV) ethoxide, titanium(IV) isopropoxide, titanium(IV) n-propoxide, titanium(IV) n-butoxide, titanium(IV) 2-ethylhexoxide, or a combination thereof. In a particular aspect, the titanium-containing compound can be titanium(IV) isopropoxide.

In an aspect, the titanium-containing compound suitable for use in the titanium-containing solution (e.g., ATS) of the present disclosure comprises a Ti salt such as oxylate, lactate, citrate, glycolate, tartrate, etc.

In a still further aspect, the titanium-containing compound suitable for use in the present disclosure can comprise hydrous titania, titanium hydroxide, titanium dioxide, titanic acid, titanyl sulfate, titanium acetylacetonate, titanium oxyacetylacetonate, or a combination thereof.

In yet another aspect, the titanium-containing compound suitable for use in the present disclosure can comprise a titanium(IV) halide, non-limiting examples of which include titanium tetrachloride, titanium tetrabromide, titanium(IV) oxychloride, and titanium(IV) oxybromide. In a further aspect the titanium(IV) halide can comprise a titanium alkoxyhalide having the general formula $Ti(OR)_nQ_{4-n}$; wherein each R independently is ethyl, isopropyl, n-propyl, isobutyl, or n-butyl; wherein Q may be a fluoride, a chloride, a bromide, an iodide, or a combination thereof, and wherein n may be an integer from 1 to 4.

In aspects, the titanium compound can be formed in situ in the aqueous titanium solution. For example, in aspects, forming an aqueous titanium solution comprising a titanium compound having the formula $Ti(acac)_2(OR)_2$ comprises in situ formation of the titanium compound having the formula $Ti(acac)_2(OR)_2$ by the combination of acetylacetone (acac) and a titanium precursor having the formula $Ti(OR)_4$ during formation of the aqueous titanium solution.

In an aspect, the titanium compound has the formula $Ti(OR)_4$, $TiO(OR)_2$, $Ti(OR)_2(acac)_2$, or $Ti(OR)_2(oxal)$, wherein "acac" is acetylacetonate, "oxal" is oxalate, and each R independently is ethyl, isopropyl, n-propyl, isobutyl, or n-butyl. In an aspect, the titanium compound is a titanium (IV) compound selected from the group consisting of $Ti(OH)_4$, $TiO(OH)_2$, $TiO_2$, $TiO(oxalate)_2$, and combinations thereof, or a titanium (III) compound selected from the group consisting of $Ti_2(SO_4)_3$, $Ti(OAc)_3$, $Ti(oxalate)_3$, $Ti(NO_3)_3$, and combinations thereof.

An amount of titanium present in an olefin polymerization catalyst of the present disclosure may range from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % titanium based upon the total weight of the olefin polymerization catalyst. In another aspect, the amount of titanium present in the olefin polymerization catalyst may range from about 1 wt. % to about 5 wt. % titanium based upon the total weight of the olefin polymerization catalyst. Herein, a titanium percentage refers to a weight percent (wt. %) of titanium associated with the olefin polymerization catalyst based upon the total weight of the olefin polymerization catalyst after completion of all processing steps (i.e., after activation via calcination). In a further aspect, an amount of titanium present in a pre-catalyst composition of the present disclosure may range from about 0.01 wt. % to about 25 wt. %; alternatively, from about 0.1 wt. % to about 20 wt. %; alternatively, from about 0.5 wt. % to about 10 wt. %; alternatively, from about 1 wt. % to about 6 wt. %; or alternatively, from about 2 wt. % to about 4 wt. % titanium based upon a total weight of silica within the pre-catalyst. Herein, a titanium percentage refers to a weight percent (wt. %) of titanium associated with the pre-catalyst composition based upon a total weight of silica within the pre-catalyst composition after completion of all processing steps excluding activation via calcination.

The titanium-containing solution (e.g., aqueous titanium solution (ATS)) of this disclosure further comprises a surfactant. Surfactants (also referred to as surface active agents) suitable for use in the present disclosure are compounds that lower the surface tension (or interfacial tension) between two liquids, between a gas and a liquid, or between a liquid and a solid. Surfactants are usually organic compounds that are amphiphilic, meaning they contain both one or more hydrophobic groups (e.g., tails) and one or more hydrophilic groups (e.g., heads). Therefore, a surfactant contains both a water-insoluble (or oil-soluble) component and a water-soluble component. In an aspect, the surface-active molecule is partly hydrophilic (water-soluble) and partly lipophilic (soluble in lipids, or oils). The "tails" of most surfactants are fairly similar, consisting of a hydrocarbon chain, which can be branched, linear, or aromatic. Most commonly, surfactants are classified according to polar head group. A non-ionic surfactant has no charged groups in its head. An ionic surfactant carries a net positive or negative charge in its head. If the charge is negative, the surfactant is more specifically called anionic. If the charge is positive, the surfactant is more specifically called cationic. A zwitterionic or amphoteric surfactant contains a head with two oppositely charged groups. In an aspect, the surfactant comprises a non-ionic surfactant, an anionic surfactant, a cationic surfactant, a zwitterionic surfactant, or a combination thereof. In an aspect, the surfactant comprises a non-ionic surfactant, a cationic surfactant, or a combination thereof.

In aspects, the surfactant comprises a non-ionic surfactant, a cationic surfactant, an anionic surfactant, or a combination thereof. In aspects, the surfactant comprises a non-ionic surfactant. In aspects, the surfactant comprises a cationic surfactant. In aspects, the surfactant comprises an anionic surfactant. In aspects, the surfactant comprises a non-ionic surfactant, a cationic surfactant, or a combination thereof. In aspects, the titanium-containing solution (e.g., ATS) comprises from about 1% to about 25%, from about 2% to about 20%, or from about 5% to about 15% of the surfactant, based on weight of the surfactant and the weight of the titanium solution. Alternatively, the amount of surfactant used in the titanium-containing solution (e.g., ATS) can be from about 2% to about 50%, from about 4% to about 40%, or from about 10% to about 30% of the surfactant, based on weight of the silica. In aspects, the titanium-containing solution (e.g., ATS) comprises from about 0.5% to about 15%, from about 1% to about 10%, or from about 3% to about 10% of the surfactant, based on weight of the surfactant and the weight of the titanium.

In a further aspect, the surfactant may be any surfactant suitable for as a titanation ligand as disclosed herein. Non-limiting examples of surfactants suitable for use in the present disclosure include nonionic surfactants, ionic surfactants, amphoteric surfactants, or combinations thereof. In an aspect, the surfactant may be a nonionic surfactant. In a further aspect, the surfactant comprises one or more functional groups including but not limited to alkoxylates, polyalkoxylates, ethoxylates, polyethoxylates, glucosides, sulfates, sulfonates, disulfonates, phosphate esters, sulfosuccinates, quaternary ammonium salts, betaines, or combinations thereof. In yet a further aspect, the surfactant may be a nonionic surfactant comprising one or more functional groups including polyalkoxylates, polyethoxylates, or glucosides; alternatively, polyalkoxylates; alternatively, polyethoxylates; alternatively, glucosides; or combinations thereof. In a particular aspect, the surfactant may be a nonionic surfactant comprising a polyethoxylated alcohol, a polyethoxylated mercaptan, or a combination thereof, alternatively, a polyethoxylated alcohol; or alternatively, a polyethoxylated mercaptan.

In aspects, the surfactant comprises one or more or alkyl, aryl, or alkylaryl sulfates; sulfonates or phosphates of alkali metals, or the corresponding ammonium salts. Suitable surfactants also can comprise alkylsulfonic acids, sulfosuccinate salts, fatty acid salts, ethoxylated alcohols, amphiphilic copolymers, or combinations thereof.

In a still further aspect, the surfactant may comprise one or more of the following: 1-Oleoyl-rac-glycerol, Brij® 58, Brij® L23, Brij® L4, Brij® O10, CYMAL-2®, CYMAL-5®, CYMAL-6®, Decaethylene glycol monododecyl ether, Decyl β-D-glucopyranoside, Decyl 3-D-maltopyranoside, Deoxy-BigCHAP, Digitonin, ECOSURF™ EH-9, ECOSURF™ SA-9, Genapol® X-100, Igepal® CA-630, Igepal® CA-720, Kolliphor® P 188, Kolliphor® P 407, Kolliphor® EL, MEGA-8, MEGA-9, MEGA-10, Methoxypolyethylene glycol, N,N-Dimethyldodecylamine N-oxide, n-Dodecyl β-D-maltoside, n-Heptyl β-D-thioglucopyranoside, n-Hexadecyl β-D-maltoside, n-Nonyl-β-D-Glucopyranoside, n-Nonyl-β-D-maltoside, n-Octyl-β-D-maltoside, n-Octyl-β-D-thioglucopyranoside, n-Octyl-b-D-Glucopyranoside, Nonaethylene glycol monododecyl ether, Nonidet™ P40 Substitute, Nonylphenyl-polyethyleneglycol acetate, Octaethylene glycol monododecyl ether, PLURONIC® 25 R-2, PLURONIC® 10 R-5, PLURONIC® F-127, PLURONIC® F-68, Poloxamer 407, Poly(ethylene glycol), Polyoxyethylene (10) tridecyl ether, Polyoxyethylene (40) stearate, Polysorbate 20, Polysorbate 60, Polysorbate 80, Saponin, Span® 20, Span® 40, Span® 60, Span® 80, Span® 85, Sucrose monolaurate, Synperonic® PE/P84, SURFYNOL® 61, SURFYNOL® 465, SURFYNOL® 2502, TERGITOL™, TERGITOL™ NP-7, TERGITOL™ NP-9, TERGITOL™ NP-10, TERGITOL™ NP-40, TERGITOL™ 15-S-7, TERGITOL™ 15-S-9, TERGITOL™ 15-S-30, TERGITOL™ 15-S-40, TERGITOL™ TMN 6, TERGITOL™ TMN 10, TERGITOL™ TMN-100X, Tetraethylene glycol monododecyl ether, Tetramethylammonium hydroxide pentahydrate, Thesit®, TRITON™ X-100, TRITON™ X-114, TRITON™ X-165, TRITON™ X-305, TRITON™ X-405, TRITON™ X-405, TRITON™ X-705, TRITON™-CG-110, TWEEN® 20, TWEEN® 40, TWEEN® 60, TWEEN® 65, TWEEN® 80, TWEEN®85, Tyloxapol, and Undecyl-β-D-maltoside, all of which are available commercially from MilliporeSigma, and AQUA-CLEEN® available commercially from Chemical Products Industries, Inc. In a particular aspect the surfactant can comprise TERGITOL® 15-S-7 or AQUA-CLEEN®.

In some embodiments, the titanium-containing solution (e.g., aqueous titanium solution (ATS)) of this disclosure further comprises a carboxylate. In aspects, the titanium-containing solution comprises a mono-carboxylate, a multi-carboxylate, an alpha-hydroxy carboxylate, a β-hydroxycarboxylates, an α-ketocarboxylate, or a combination thereof. In aspects, an aqueous titanium solution is produced via inclusion of a carboxylic acid. The carboxylic acid can comprise a monocarboxylic acid, a dicarboxylic acid, a tricarboxylic acid, an α-hydroxycarboxylic acid, a β-hydroxycarboxylic acid, an α-ketocarboxylic acid, or a combination thereof. In an aspect, the carboxylic acid may be a $C_1$ to $C_{15}$ monocarboxylic acid or a $C_1$ to $C_5$ monocarboxylic acid; alternatively, a $C_1$ to $C_{15}$ dicarboxylic acid or a $C_1$ to $C_5$ dicarboxylic acid; alternatively, a $C_1$ to $C_{15}$ tricarboxylic acid or a $C_1$ to $C_5$ tricarboxylic acid; alternatively, a $C_1$ to $C_{15}$ α-hydroxycarboxylic acid or a $C_1$ to $C_5$ α-hydroxycarboxylic acid; alternatively, a $C_1$ to $C_{15}$ β-hydroxycarboxylic acid or a $C_1$ to $C_5$ β-hydroxycarboxylic acid; or alternatively, a $C_1$ to $C_{15}$ α-ketocarboxylic acid or a $C_1$ to $C_5$ α-ketocarboxylic acid; or a combination thereof. As utilized herein, multi-carboxylic includes carboxylic acids comprising two or more carboxylic acid groups.

In a particular aspect, the titanium-containing solution comprises a carboxylic acid selected from the group consisting of acetic acid, formic acid, citric acid, gluconic acid, glycolic acid, glyoxylic acid, lactic acid, malic acid, malonic acid, oxalic acid, propionic acid, phosphonoacetic acid, tartaric acid, and combinations thereof. In yet a further aspect, the titanium-containing solution comprises oxalic acid. In yet a further aspect, the titanium-containing solution comprises malonic acid.

In aspects, the titanium-containing solution (e.g., aqueous titanium solution (ATS)) comprises an equivalent molar ratio of the carboxylic acid to the titanium compound in a range of from about 1 to about 4, from about 1.5 to about 3, or from about 1.8 to about 2.5, or alternatively greater than or equal to about 1, 2, 3, or 4. In aspects, the titanium-containing solution (e.g., aqueous titanium solution (ATS)) comprises an acidic equivalent ratio of the carboxylic acid to the titanium compound in a range of from about 2 to about 12, from about 3 to about 10, or from about 4 to about 8.

In an aspect, the titanium-containing solution of the present disclosure comprises a solvent. The solvent may be an aqueous solvent, an alcohol, a ketone, or a combination thereof. In an aspect, the solvent comprises water and the resultant solution is an aqueous titanium solution (ATS). A non-limiting example of an aqueous solvent suitable for use in the present disclosure comprises deionized water, distilled water, filtered water, or a combination thereof. Non-limiting examples of alcohols suitable for use as the solvent include methanol, ethanol, n-propanol, isopropanol, n-butanol, isobutanol, pentanol, hexanol, cyclohexanol, heptanol, octanol, benzyl alcohol, phenol, or a combination thereof. Examples of ketones include acetone, 2-pentanone, 3-hexanone, and the like.

The ATS can be formed by combining the titanium compound, the carboxylate(s) (when present), the surfactant(s), and the solvent in any suitable order (e.g., simultaneous or sequentially) known to one of skill in the art and with the help of this disclosure. In a particular aspect, an a titanium-containing solution (e.g., ATS) as disclosed herein comprises an aqueous ligand mixture that may be prepared by contacting a carboxylate (e.g., carboxylic acid) as described herein and the solvent (e.g., water) to form acid aqueous solution, followed by addition of a titanium compound, followed by addition of a surfactant. In aspects, water, a titanium compound and a carboxylate are combined to form a first solution, and a small amount of surfactant, as described hereinabove, is added to the first solution to form an ATS. In an aspect, the titanium compound, the carboxylate(s), the surfactant(s), and the solvent (e.g., water) can be contacted simultaneously to form the titanium-containing solution (e.g., ATS). In an alternative aspect, the titanium-containing compound, the carboxylate(s), and the surfactant(s) may be contacted and subsequently contacted with the solvent (e.g., water) to form the titanium-containing solution (e.g., ATS) as disclosed herein. In a further aspect, the titanium compound can be dissolved in one or both of the carboxylate(s) and the surfactant(s); and solvent (e.g., water) added thereto.

In aspects, the titanium-containing solution consists essentially of or consists of the titanium compound, the carboxylate(s), the surfactant(s), and the solvent. In aspects, the aqueous titanium solution (ATS) consists essentially of or consists of the titanium compound, the carboxylate(s), the surfactant(s), and water.

In a particular aspect, the aqueous titanium solution (ATS) suitable for use in the present disclosure may be characterized by a pH of less than about 5.5. Alternatively, the ATS may be characterized by a pH in a range of from about 2.5 to about 5.5; alternatively, from about 3.0 to about 5.0; or alternatively, from about 3.5 to about 4.5.

The titanium-containing solution (e.g., ATS) comprises titanium dissolved therein, such that an olefin polymerization catalyst and a pre-catalyst composition thereof of the present disclosure comprise titanium. The titanium can be incorporated into the pre-catalyst composition or the catalyst by contacting a silica support with the titanium solution-containing (e.g., ATS).

In an aspect, the titanium-containing solution (e.g., ATS) comprises titanium and chromium dissolved therein, such that an olefin polymerization catalyst and a pre-catalyst composition thereof of the present disclosure comprise titanium and chromium. The titanium and chromium can be incorporated into the pre-catalyst composition or the catalyst by contacting a silica support with the titanium solution-containing (e.g., ATS) that further comprises one or more chromium-containing compounds of the type disclosed herein. The ATS further comprising chromium can be formed by combining the titanium compound, the carboxylate(s) (when present), the surfactant(s), the chromium-containing compound, and the solvent in any suitable order (e.g., simultaneous or sequentially) known to one of skill in the art and with the help of this disclosure. In a particular aspect, an a titanium-containing solution (e.g., ATS) as disclosed herein comprises an aqueous ligand mixture that may be prepared by contacting a carboxylate (e.g., carboxylic acid) as described herein and the solvent (e.g., water) to form acid aqueous solution, followed by addition of a titanium compound and a chromium-containing compound, followed by addition of a surfactant. In aspects, water, a titanium compound, a chromium-containing compound, and a carboxylate are combined to form a first solution, and a small amount of surfactant, as described hereinabove, is added to the first solution to form an ATS. In an aspect, the titanium compound, the chromium-containing compound, the carboxylate(s), the surfactant(s), and the solvent (e.g., water) can be contacted simultaneously to form the titanium-containing solution (e.g., ATS). In an alternative aspect, the titanium-containing compound, the chromium-containing compound, the carboxylate(s), and the surfactant(s) may be contacted and subsequently contacted with the solvent (e.g., water) to form the titanium-containing solution (e.g., ATS) as disclosed herein. In a further aspect, the titanium compound and the chromium-containing compound can be dissolved in one or both of the carboxylate(s) and the surfactant(s); and solvent (e.g., water) added thereto. In aspects, the titanium-containing solution consists essentially of or consists of the titanium compound, the chromium-containing compound, the carboxylate(s), the surfactant(s), and the solvent. In aspects, the aqueous titanium solution (ATS) consists essentially of or consists of the titanium compound, the chromium-containing compound, the carboxylate(s), the surfactant(s), and water.

Thus, a catalyst (e.g., a Cr/Si—Ti olefin polymerization catalyst) and a pre-catalyst composition thereof of the present disclosure comprise a support material that comprises silica (i.e., silicon dioxide, $SiO_2$), which is referred to herein a silica support. The silica support provides a solid substrate that provides physical/structural support for the catalytic metals (e.g., Cr and Ti) of the pre-catalyst composition and the resultant catalyst (e.g., olefin polymerization catalyst). The silica support may be any silica support suitable for preparation of the olefin polymerization catalyst and the pre-catalyst composition thereof as disclosed herein. The silica support may be a naturally occurring material comprising silica or a synthetic material comprising silica. The silica support may be prepared using any suitable method, e.g., the silica support may be prepared by hydrolyzing tetrachlorosilane ($SiCl_4$) with water or by contacting sodium silicate and a mineral acid. In a particular aspect, the silica support may be a produced by a gel manufacturing process (e.g., a sol-gel process), which may provide a hydrogel silica support or a xerogel silica support. Silica supports produced via gel manufacturing processes can be dried prior to contact with any other catalyst components (e.g., drying a hydrogel to form a xerogel).

The silica support suitable for use in the present disclosure may contain greater than about 50 wt. % silica; alternatively, greater than about 80 wt. % silica; or alternatively, greater than about 95 wt. % silica based upon the total weight of the silica support. In an aspect, the silica support comprises an amount of silica in a range of from about 70 wt. % to about 95 wt. % based upon a total weight of the silica support.

The silica support may include additional components that do not adversely affect the catalyst, such as zirconia, alumina, thoria, magnesia, fluoride, sulfate, phosphate, or a combination thereof. In a particular aspect, the silica support of the present disclosure comprises alumina, and may be referred to as a silica-alumina support (i.e., a $SiO_2/Al_2O_3$ support).

Non-limiting examples of silica supports suitable for use in this disclosure include ES70, which is a silica support material with a surface area of 300 $m^2$/gram and a pore volume of 1.6 $cm^3$/gram, that is commercially available from PQ Corporation; V398400, which is a silica support material that is commercially available from Evonik; and the SYLOPOL® family of silica supports commercially available from W. R. Grace & Co.

The silica support suitable for use in the present disclosure may have a surface area and a pore volume effective to provide for the production of an active olefin polymerization catalyst. In an aspect of the present disclosure, the silica support possesses a surface area in a range of from about 100 $m^2$/gram to about 1000 $m^2$/gram; alternatively, from about 250 $m^2$/gram to about 1000 $m^2$/gram; alternatively, from about 250 $m^2$/gram to about 700 $m^2$/gram; alternatively, from about 250 $m^2$/gram to about 600 $m^2$/gram; or alternatively, greater than about 250 $m^2$/gram. The silica support may be porous and further characterized by a pore volume of greater than about 0.9 $cm^3$/gram; alternatively, greater than about 1.0 $cm^3$/gram; or alternatively, greater than about 1.5 $cm^3$/gram. In an aspect of the present disclosure, the silica support is characterized by a pore volume in a range of from about 1.0 $cm^3$/gram to about 2.5 $cm^3$/gram. The silica support may be further characterized by an average particle size in a range of from about 10 microns to about 500 microns; alternatively, about 25 microns to about 300 microns; or alternatively, about 40 microns to about 150 microns. Generally, an average pore size of the silica support may be in a range of from about 10 Angstroms (Å) to about 1000 Angstroms (Å). In one aspect of the present disclosure, the average pore size of the silica support is in a range of from about 50 Angstroms (Å) to about 500 Angstroms (Å); alternatively, from about 75 Angstroms (Å) to about 350 Angstroms (Å).

The silica support may be present in the olefin polymerization catalyst and a pre-catalyst composition thereof in an amount in a range of from about 50 wt. % to about 99 wt. %; or alternatively, from about 80 wt. % to about 99 wt. %. Herein a silica support percentage refers to a weight percent (wt. %) of the silica support associated with the olefin polymerization catalyst based upon the total weight of the olefin polymerization catalyst after completion of all processing steps (i.e., after activation via calcination). Alternatively, the silica support percentage refers to a weight percent (wt. %) of the silica support associated with the pre-catalyst based upon the total weight of the pre-catalyst after completion of all relevant processing steps excluding activation via calcination.

In an aspect, preparation the catalyst (e.g., a Cr/Si—Ti olefin polymerization catalyst) and the pre-catalyst composition thereof excludes thermal treatment (e.g., drying) of the silica support prior to contact with any other catalyst component (e.g., prior to contact with the titanium-containing solution (e.g., ATS) and/or prior to contact with a chromium-containing compound). In an embodiment where the silica support is a xerogel silica support, the xerogel is not subjected to additional drying after formation of the xerogel (e.g., after formation, a xerogel silica support may absorb some ambient moisture which is not removed by further drying prior to contact with any other catalyst component). Consequently, the silica support suitable for use in the present disclosure may be a termed a hydrated silica support. Without wishing to be limited by theory, the hydrated silica support comprises a silica support wherein water evolution occurs when the silica support is heated within a range of from about 180° C. to about 200° C. under vacuum conditions for a period of time ranging from about 8 hours to about 20 hours. In a further aspect, the silica support may contain from about 0.1 wt. % to about 20 wt. % water; alternatively, about 1 wt. % to about 20 wt. % water; alternatively, about 1 wt. % to about 10 wt. % water; or alternatively, about 0.1 wt. % to about 10 wt. % water based upon the total weight of the silica support.

In alternative aspects, the silica support may be a dried silica support, and the method of making the pre-catalyst composition can further comprise drying a hydrated silica support to provide the dried silica support, and the dried silica support can be subsequently contacted with one or more additional catalyst components (e.g., contacted with the titanium-containing solution (e.g., ATS) and/or contacted with a chromium-containing compound). The silica support can be dried, for example, by heating the silica support to a temperature in a range of from about 150° C. to about 250° C. and maintaining the temperature of the silica support in the range of from about 150° C. to about 250° C. for a time period of from about 1 hour to about 24 hours to form the dried support.

In a particular aspect of the present disclosure, a silica support suitable for use in the present disclosure comprises chromium. The silica support comprising chromium may be termed a chrominated silica support or a chromium-silica support (Cr—Si support or Cr-silica support). In another aspect, the chrominated support comprises the characteristics disclosed herein for the silica support while additionally containing chromium. A non-limiting example of the chrominated silica support is HA30W, which is a chromium-silica support material that is commercially available from W. R. Grace and Company. In other aspects, a method of forming a pre-catalyst composition or catalyst of this disclosure can further comprise contacting the silica support with a chromium-containing compound to form a chrominated silica support, and the chrominated silica support can be contacted with a titanium-containing solution (e.g., ATS) of the type disclosed herein.

In a still further aspect, an olefin polymerization catalyst and/or a pre-catalyst composition thereof of the present disclosure comprises chromium. In such aspects, chromium can be incorporated into the pre-catalyst composition or the catalyst via the contacting of the silica support, the titanated support, the dried titanated support, or a combination thereof with a chromium-containing compound to form the pre-catalyst composition, which can be calcined to form the polymerization catalyst. In an aspect, one or more chromium-containing compounds are added to the titanium-containing solution (e.g., ATS), and chromium and titanium are added concurrently to the silica support by contact with the titanium-containing solution (e.g., ATS) that further comprises chromium. The source of chromium may be any chromium-containing compound capable of providing a sufficient amount of chromium to the olefin polymerization catalyst and the pre-catalyst thereof. In an aspect, the chromium-containing compound may be a water-soluble chromium compound or a hydrocarbon-soluble chromium compound, and the silica support may be contacted with an aqueous chromium-containing solution (e.g., an ATS further comprising a chromium-containing compound) or a hydrocarbon chromium-containing solution. Examples of water-soluble chromium compounds include chromium trioxide, chromium acetate, chromium nitrate, or a combination thereof. Examples of hydrocarbon-soluble chromium compounds include tertiary butyl chromate, biscyclopentadienyl chromium(II), chromium(III) acetylacetonate, or a combination thereof. In one aspect of the present disclosure, the chromium-containing compound may be a chromium(II) compound, a chromium(III) compound, or a combination thereof. Suitable chromium(III) compounds include, but are not limited to, chromium(III) carboxylates, chromium(III) naphthenates, chromium(III) halides, chromium(III) sulfates, chromium(III) nitrates, chromium(III) dionates, or a combination thereof. Specific chromium(III) compounds include, but are not limited to, chromium(III) sulfate, chromium(III) chloride, chromium(III) nitrate, chromium(III) bromide, chromium(III) acetylacetonate, and chromium(III) acetate. Suitable chromium(II) compounds include, but are not limited to, chromium(II) chloride, chromium(II) bromide, chromium(II) iodide, chromium(II) sulfate, chromium (II) acetate, or a combination thereof.

An amount of chromium present in the olefin polymerization catalyst may be in a range of from about 0.01 wt. % to about 10 wt. %; alternatively, from about 0.5 wt. % to about 5 wt. %; alternatively, from about 1 wt. % to about 4 wt. %; or alternatively, from about 2 wt. % to about 4 wt. % chromium based upon the total weight of the olefin polymerization catalyst. In another aspect, the amount of chromium present in the olefin polymerization catalyst may be in a range of from about 1 wt. % to about 5 wt. % chromium based upon the total weight of the olefin polymerization catalyst. Herein, a chromium percentage refers to a weight percent (wt. %) of chromium associated with the olefin polymerization catalyst based upon the total weight of the olefin polymerization catalyst after completion of all processing steps (i.e., after activation via calcination). In a further aspect, an amount of chromium present in a pre-catalyst composition may be in a range of from about 0.01 wt. % to about 10 wt. %; alternatively, from about 0.1 wt. % to about 5 wt. %; alternatively, from about 0.2 wt. % to about 2 wt. %; or alternatively, from about 0.5 wt. % to about 1.5 wt. % chromium based upon a total weight of silica within the pre-catalyst composition. Herein, a chromium percentage refers to a weight percent (wt. %) of chromium associated with the pre-catalyst composition based upon the total weight of silica within the pre-catalyst composition after completion of all processing steps excluding activation via calcination.

In aspects of the present disclosure the pre-catalyst composition components or catalyst components disclosed herein may be contacted in any order or fashion deemed suitable to one of ordinary skill in the art with the aid of the present disclosure to produce, respectively, a pre-catalyst composition or an olefin polymerization catalyst having the characteristics disclosed herein.

In aspects, forming the titanated support further comprises contacting a silica support with the titanium-containing solution (e.g., ATS) to form the titanated support, which can be dried to form a dried titanated support. In such aspects, the silica support (e.g., a hydrated or dried silica support), the titanated support, the dried titanated support, or a combination thereof can be contacted with the chromium-containing compound and dried to form the pre-catalyst composition. In other aspects, forming the titanated support further comprises contacting a Cr-silica support with the titanium-containing solution (e.g., ATS) to form a chrominated, titanated support that can be dried to for the pre-catalyst and calcined to form the catalyst.

In a particular aspect, a method of forming a pre-catalyst composition comprises forming a titanated silica support by contacting a chrominated silica support (e.g., a hydrated or dried chrominated silica support) with the aqueous titanium solution (ATS), as described herein, to form a titanated, chrominated support; and drying the titanated, chrominated support to form the pre-catalyst composition, which can be calcined to form the catalyst.

In another particular aspect, a method of forming a pre-catalyst composition comprises forming a titanated, chrominated silica support by contacting a silica support (e.g., a hydrated or dried silica support) with the aqueous titanium solution (ATS) that further comprises a chromium-containing compound, as described herein, to form a titanated, chrominated support; and drying the titanated, chrominated support to form the pre-catalyst composition, which can be calcined to form the catalyst.

In another particular aspect, a method of forming a pre-catalyst composition comprises forming a titanated silica support by contacting a silica support (e.g., a hydrated or dried silica support, as described herein) with the aqueous titanium solution (ATS), as described herein, to form a titanated support; contacting the titanated support with the chromium-containing compound to form a chrominated, titanated support, and drying the chrominated, titanated support to form the pre-catalyst composition, which can be calcined to form the catalyst.

In another particular aspect, a method of forming a pre-catalyst composition comprises forming a titanated silica support by contacting a silica support (e.g., a hydrated or dried silica support) with the aqueous titanium solution (ATS), as described herein, to form a titanated support; drying the titanated support to form the dried titanated support; and contacting the dried titanated support with the chromium-containing compound to form chrominated, titanated support, and drying the chrominated, titanated support to form the pre-catalyst composition, which can be calcined to form the catalyst.

In an aspect, contacting of the silica support (e.g., the hydrated silica support, the dried silica support) or the chrominated silica support with the titanium-containing solution (e.g., ATS) can be effected by any suitable methodology known to one of skill in the art and with the help of this disclosure, such as ion-exchange, incipient wetness, spray drying, pore fill, aqueous impregnation, or the like.

In an aspect, contacting of the silica support (e.g., the hydrated silica support, the dried silica support), the titanated silica support, or the dried titanated silica support with the chromium-containing compound can be effected by any suitable methodology known to one of skill in the art and with the help of this disclosure, such as ion-exchange, incipient wetness, spray drying, pore fill, aqueous impregnation, organic solvent impregnation, melt coating, or the like.

In an aspect, contacting of the silica support (e.g., the hydrated silica support, the dried silica support) with the titanium-containing solution (e.g., ATS) that further comprises a chromium-containing compound can be effected by any suitable methodology known to one of skill in the art and with the help of this disclosure, such as ion-exchange, incipient wetness, spray drying, pore fill, aqueous impregnation, or the like.

In some aspects of the present disclosure, contacting of the components utilized in preparation of the olefin polymerization catalyst may be carried out in the presence of a reaction media. In a further aspect, the reaction media may be formed during contacting of the components utilized in preparation of the olefin polymerization catalyst. The reaction media can comprise a solvent (e.g., water) as disclosed herein and one or more liquids associated with the components utilized in preparation of the olefin polymerization catalyst (e.g., water associated with the silica support, water associated with the carboxylate (e.g., carboxylic acid), water associated with a chromium-containing compound). In an aspect, the reaction media excludes any solid component utilized in the preparation of the olefin polymerization catalyst disclosed herein (e.g., silica support and any solids associated therewith). In some aspects, a sum of an amount of water present in the reaction media may be in a range of from about 1 wt. % to about 99 wt. %; alternatively, from about 1 wt. % to about 50 wt. %; alternatively, from about 1 wt. % to about 20 wt. %; or alternatively, from about 1 wt. % to about 10 wt. % based upon the total weight of the reaction media. In yet a further aspect, the reaction media may contain greater than about 20 wt. % water; alternatively, about 40 wt. % water; alternatively, about 60 wt. % water; alternatively, about 80 wt. % water; or alternatively, about 90 wt. % water based upon the total weight of the reaction media wherein the water may originate from one or more components utilized in preparation of the olefin polymerization catalyst.

Drying the titanated support, the chrominated support (e.g., Cr-silica support) and/or the chrominated, titanated support can be effected by any means known to one of skill in the art and with the help of this disclosure. For example, drying can comprise heating the support to a temperature in a range of from about 25° C. to about 300° C.; alternatively, from about 50° C. to about 150° C.; or alternatively, from about 75° C. to about 100° C. Drying can further comprise maintaining the temperature in the range of from about 25° C. to about 300° C.; alternatively, from about 50° C. to about 150° C.; or alternatively, from about 75° C. to about 100° C. for a time period of from about 0.01 minutes to about 6 hours, alternatively from about 30 minutes to about 6 hours to form a dried support (e.g., which can, in aspects be the pre-catalyst composition). In aspects, for example, drying can be optionally used to remove solvent introduced by the addition of the titanium-containing compound and/or the chromium-containing compound and/or the presence of a reaction media. A dried chromated, titanated support may be referred to as a pre-catalyst that is suitable for activation (e.g., via calcining) to become a catalyst (e.g., an olefin polymerization catalyst).

In an aspect of the present disclosure, a method for preparation of an olefin polymerization catalyst further comprises activating a pre-catalyst composition prepared as disclosed herein via a calcination step. In some aspects, calcination of the pre-catalyst composition comprises heating the pre-catalyst composition in an oxidizing environment to produce the olefin polymerization catalyst. For example, the pre-catalyst composition may be calcined by heating the pre-catalyst composition in the presence of air to a temperature in a range of from about 400° C. to about 1000° C.; alternatively, from about 500° C. to about 900° C.; or alternatively, from about 500° C. to about 850° C. Calcination of the pre-catalyst composition may further comprise maintaining the temperature of the pre-catalyst composition in the presence of air in the range of from about 400° C. to about 1000° C.; alternatively, from about 500° C. to about 900° C.; or alternatively, from about 500° C. to about 850° C. for a time period in a range of from about 1 minute to about 24 hours; alternatively, from about 1 minute to about 12 hours; alternatively, from about 20 minutes to about 12 hours; alternatively, from about 1 hour to about 10 hours; alternatively, from about 3 hours to about 10 hours; or alternatively, from about 3 hours to about 5 hours to produce the olefin polymerization catalyst.

Also disclosed herein are a titanated silica support, a pre-catalyst composition and a polymerization catalyst produced as described herein (e.g., products of the processes described herein). In an aspect, disclosed herein is a pre-catalyst comprising a silica support and (a) titanium in an amount ranging from about 0.01% to about 10% by total weight of the pre-catalyst, wherein the titanium is present within a surface layer on the silica support; (b) a carboxylate (when present) in an amount ranging from about 5% to about 25% by total weight of the pre-catalyst; and (c) a surfactant in an amount ranging from about 2% to about 20% by total weight of the pre-catalyst. In an aspect, the carboxylate is provided by oxalic acid, citric acid, lactic acid, tartaric acid, gluconic acid, glycolic acid, or combinations thereof, and such carboxylate may be present and detectable in the pre-catalyst. In an aspect, the surfactant is selected from the group consisting of nonionic and cationic, and such surfactant may be present and detectable in the pre-catalyst. In an aspect, the pre-catalyst further comprises (d) chromium in an amount ranging from about 0.01% to about 10% by total weight of the pre-catalyst. In an aspect, the silica support comprises a surface area of from about 100 m$^2$/gram to about 1000 m$^2$/gram and a pore volume of from about 1.0 cm$^3$/gram to about 2.5 cm$^3$/gram.

Further disclosed herein is a method of producing a polymer, and a polymer produced via the method. The method of producing a polymer comprises contacting a polymerization catalyst as described herein with a monomer under conditions suitable for formation of the polymer; and recovering the polymer. In aspects, the monomer comprises ethylene and the polymer comprises polyethylene.

The olefin polymerization catalysts of the present disclosure are suitable for use in any olefin polymerization method, using various types of polymerization reactors. In an aspect of the present disclosure, a polymer of the present disclosure is produced by any olefin polymerization method, using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors can comprise fluidized bed reactors or staged horizontal reactors. Slurry reactors can comprise vertical and/or horizontal loops. High pressure reactors can comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, olefin polymerization catalyst and/or co-catalysts, diluents, and/or other materials of the polymerization process.

Polymerization reactor systems of the present disclosure can comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to, multiple loop reactors, multiple gas phase reactors, a combination of loop and gas phase reactors, multiple high pressure reactors, and a combination of high pressure with loop and/or gas reactors. The multiple reactors may be operated in series or in parallel. In an aspect of the present disclosure, any arrangement and/or any combination of reactors may be employed to produce the polymer of the present disclosure.

According to one aspect of the present disclosure, the polymerization reactor system can comprise at least one loop slurry reactor. Such reactors are commonplace, and can comprise vertical or horizontal loops. Generally, continuous processes can comprise the continuous introduction of a monomer, an olefin polymerization catalyst, and/or a diluent into a polymerization reactor and the continuous removal from this reactor of a suspension comprising polymer particles and the diluent. Monomer, diluent, olefin polymerization catalyst, and optionally any comonomer may be continuously fed to a loop slurry reactor, where polymerization occurs. Reactor effluent may be flashed to remove the liquids that comprise the diluent from the solid polymer, monomer and/or comonomer. Various technologies may be used for this separation step, including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Diluents suitable for use in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is the polymerization of propylene monomer as disclosed in U.S. Pat. No. 5,455,314, which is incorporated by reference herein in its entirety.

According to yet another aspect of the present disclosure, the polymerization reactor can comprise at least one gas phase reactor. Such systems may employ a continuous recycle stream containing one or more monomers continuously cycled through a fluidized bed in the presence of the olefin polymerization catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors can comprise a process for multi-step gas-phase polymerization of olefins, in which olefins are polymerized in the gaseous phase in at least two independent gas-phase polymerization zones while feeding an olefin polymerization catalyst-containing polymer formed in a first polymerization zone to a second polymerization zone. One type of gas phase reactor suitable for use is disclosed in U.S. Pat. Nos. 4,588,790, 5,352,749, and 5,436,304, each of which is incorporated by reference in its entirety herein.

According to still another aspect of the present disclosure, a high-pressure polymerization reactor can comprise a tubular reactor or an autoclave reactor. Tubular reactors may have several zones where fresh monomer, initiators, or olefin polymerization catalysts are added. Monomer may be entrained in an inert gaseous stream and introduced at one zone of the reactor. Initiators, olefin polymerization catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another aspect of the present disclosure, the polymerization reactor can comprise a solution polymerization reactor wherein the monomer is contacted with the olefin polymerization catalyst composition by suitable stirring or other means. A carrier comprising an organic diluent or excess monomer may be employed. If desired, the monomer may be brought in the vapor phase and into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for use in the present disclosure may further comprise any combination of at least one raw material feed system, at least one feed system for an olefin polymerization catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to, temperature, pressure, type and quantity of the olefin polymerization catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig (6.9 MPa). Pressure for gas phase polymerization is usually in a range of from about 200 psig (1.4 MPa)-500 psig (3.45 MPa). High-pressure polymerization in tubular or autoclave reactors is generally run in a range of from about 20,000 psig (138 MPa) to 75,000 psig (518 MPa). Polymerization reactors can also be operated in a supercritical region occurring at generally higher temperatures and pressures. Operation at conditions above the critical point as indicated by a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness test values. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, comonomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

Polymers such as polyethylene homopolymers and copolymers of ethylene with other mono-olefins may be produced in the manner described above using the olefin polymerization catalysts prepared as described herein. Polymers produced as disclosed herein may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, films, and bottles.

A method of the present disclosure comprises contacting an olefin polymerization catalyst of the type described with an olefin monomer under conditions suitable for the formation of a polyolefin and recovering the polyolefin. In an aspect the olefin monomer is an ethylene monomer and the polyolefin is an ethylene polymer (polyethylene).

Polyethylene prepared as described herein may be characterized by a high load melt index (HLMI), in a range of from about 1 g/10 min. to about 1000 g/10 min.; alternatively, from about 3 g/10 min. to about 300 g/10 min.; alternatively, from about 6 g/10 min. to about 100 g/10 min.; or alternatively, from about 15 g/10 min. to about 40 g/10 min.

The melt index (MI) represents the rate of flow of a molten polymer through an orifice of 0.0825 inch diameter when subjected to a force of 2,160 grams at 190° C. as determined in accordance with ASTM D1238-82 condition E. The 110 represents the rate of flow of a molten polymer through an orifice of 0.0825 inch diameter when subjected to a force of 10,000 grams at 190° C. as determined in accordance with ASTM D1238-82 condition N. The HLMI (high load melt index) represents the rate of flow of a molten polymer through an orifice of 0.0825 inch diameter when subjected to a force of 21,600 grams at 190° C. as determined in accordance with ASTM D1238-82 condition F.

Utilization of an titanium-containing solution (e.g., ATS) in the preparation of an olefin polymerization catalyst of the present disclosure may be advantageous because the ATS can facilitate the association of titanium with a silica support in the presence of an aqueous solvent (e.g., water). Further advantages may occur when the titanium-containing solution utilized to form the olefin polymerization catalyst comprises an aqueous solvent (e.g., water). The solubility of titanium in the aqueous solvent may be sufficient to allow the use of spray drying methodologies for contacting the ATS and a silica support. Spray drying as used herein refers to a method of producing a dry powder from a liquid or slurry by rapidly drying with a hot gas. Spray drying methodologies may be utilized in the preparation of olefin polymerization catalysts in a continuous production method with the potential to produce large volumes of olefin polymerization catalysts. Spray drying methodologies may also be utilized in the preparation of olefin polymerization catalysts having a consistent particle size distribution.

Utilization of the titanium-containing solution comprising the aqueous solvent (i.e., ATS) may permit use of a hydrated silica support and obviate the thermal treatment required for anhydrous methods of catalyst preparation, (e.g., drying a hydrated silica support prior to contact with any other catalyst component).

Utilizing surfactants as a chelating agent, as described herein, provides a cheap, effective way of preventing hydrolysis of the titanium during aqueous titanation.

The herein disclosed utilization of surfactants as ligands for titanium, that are soluble in water but resist hydrolysis, enables binding of the titanium to a support during the production of chromium-silica-titanium (Cr/Si—Ti) catalyst. Aqueous solutions of ligands, as described herein, which are inexpensive, can be utilized in the aqueous titanation of polymerization catalysts.

Highly reactive volatile organic compounds (HRVOC) may be emitted during catalyst production. HRVOCs play a role in the formation of ozone in ozone nonattainment areas, i.e., areas that do not meet the Environmental Protection Agency's air quality standards for ground-level ozone. Consequently, processes that create HRVOC emissions may be subject to compliance with various state and federal regulations regarding HRVOC emission, such as the HRVOC emissions cap and trade program. Utilization of an aqueous titanium solution (ATS) to produce a pre-catalyst composition and a polymerization catalyst as described herein can results in the production of a reduced amount of HRVOCs during catalyst production, e.g., due to the use of the aqueous solution, rather than an organic solvent. The herein disclosed method provides an inexpensive, effective and efficient way of producing an olefin polymerization catalyst.

EXAMPLES

The following examples are given as particular aspects of the present disclosure and to demonstrate the practice and advantages thereof. It is understood that the examples are given by way of illustration and are not intended to limit the specification or the claims to follow in any manner.

In each experiment of the following examples HA30W, a Cr/silica catalyst made by W. R Grace, was titanated as described below and activated by calcination at 650° C. in air for three hours. The final catalysts contained 3.5 wt % titanium.

Activity tests were conducted in a 2.2 liter steel reactor equipped with a marine stirrer running at 400 rpm. The reactor was surrounded by a steel jacket circulating water, the temperature of which was controlled by use of steam and water heat exchangers. These were connected in an electronic feed-back loop so that the reactor temperature could be maintained at +/−0.5° C. during the reaction.

Unless otherwise stated, a small amount (0.01 to 0.10 grams normally) of the solid chromium catalyst was first charged under nitrogen to the dry reactor. Next about 0.25 g of sulfate-treated alumina (600° C.) was added as a scavenger for poisons. Then 1.2 liter of isobutane liquid was charged and the reactor heated up to the specified temperature, usually 105° C. Finally, ethylene was added to the reactor to equal a fixed pressure, normally 550 psig (3.8 MPa), which was maintained during the experiment. The stirring was allowed to continue for the specified time, usually around one hour, and the activity was noted by recording the flow of ethylene into the reactor to maintain the set pressure.

After the allotted time, the ethylene flow was stopped and the reactor slowly depressurized and opened to recover a granular polymer powder. In all cases the reactor was clean with no indication of any wall scale, coating or other forms of fouling. The polymer powder was then removed and weighed. Activity was specified as grams of polymer produced per gram of solid catalyst charged per hour.

Comparative Example 1

Experiments were performed in which 30 g of HA30W catalyst was impregnated with an aqueous solution of titanium (3.5 wt % titanium load on catalyst). First, to 50 mL of water was added 3.94 g of anhydrous oxalic acid (2 moles of oxalic acid per mole of titanium). It dissolved after a few minutes of stirring. Then freshly precipitated hydrous titania was prepared by adding 6.7 mL of titanium isopropoxide to the oxalic acid solution. After a few minutes of stirring the titania dissolved in the oxalic acid solution. Then 5 mL % of various surfactants (noted in Table 1) was added. After a few minutes of stirring, the resultant solution was added to the HA30W catalyst. After being stirred a few times, it formed a damp solid powder, which was then dried in a vacuum oven at 100° C. for typically 12 hours. Afterward, a sample of the catalyst was calcined by fluidization in dry air at 650° C. for three hours. Polymerization was carried out as described above, at 105° C., in isobutane and with 550 psig (3.8 MPa) ethylene pressure.

Two control runs, C1 and C2, were performed. Control run C1 shows the results of the base Cr/silica support, containing no titanium compound or surfactant. As seen in Table 1, the melt index obtained from the polymer produced in example C1 is low. Control run C2 shows the impregnation of titanium (at 3.5 wt %) and oxalic acid, but without surfactant. In other words, control catalyst 2 was made exactly as the inventive catalysts were made, except with the omission of the surfactant. When activated and tested in a polymerization run under the same conditions, it produced polymer. However, notice again that the melt index of the polymer made by catalyst C2 is still equally low, indicating that the titanation is completely ineffective.

In inventive runs I1-I8, the exact same procedure was employed, except for the addition of 5 mL of various surfactants, as noted in Table 1. It is noted that in every inventive run the melt index was increased relative to control runs C1 and C2. Inventive runs 15 and 16 were taken to higher productivity (yield) which tends to lower melt index. Therefore, in these runs, the catalyst also exhibited a significantly improved melt index potential, even though the observed melt index in these two runs was lower than the other inventive runs. However, notice that this is confirmed in the next inventive run, 17, where the same catalyst as used in 16 was tested again but at a lower productivity, and the melt index came up significantly, to above 12, which is also higher than the two control runs C1 and C2.

Table 1 shows the components utilized in the control and inventive experiments, and also provides the yield (grams polyethylene per gram catalyst), the activity (grams polyethylene per gram catalyst per hour), the high load melt index (HLMI, in decigrams per minute, as measured by ASTM D1238, condition 190/21.6, at 190° C. with a 21.6 kg weight), the I10 (also in decigrams per minute, and measured in the same way but with a 10 kg weight), the melt index (MI, decigrams per minute, as measured by ASTM D1238, condition 190/2.16, at 190° C. with a 2.16 kg weight), and the shear (ratio of the HLMI to the MI).

TABLE 1

| Run | Ti (wt %) | Surfactant | Yield (g/g) | Activity (g/g-h) | HLMI (dg/min) | I10 (dg/min) | MI (dg/min) |
| --- | --- | --- | --- | --- | --- | --- | --- |
| Control Runs: | | | | | | | |
| C1 | 0 | None | 2973 | 2973 | 5.5 | 0.87 | 0.000 |
| C2 | 3.5 | None | 2933 | 3088 | 6.4 | 1.03 | — |
| Inventive Runs: | | | | | | | |
| I1 | 3.5 | Pluronic 25 R-2 | 2514 | 3143 | 12.2 | 2.28 | — |
| I2 | 3.5 | Pluronic 10 R-5 | 2132 | 3120 | 11.0 | 2.04 | 0.41 |
| I3 | 3.5 | Surfynol 465 | 2970 | 3073 | 10.7 | 1.98 | 0.44 |
| I4 | 3.5 | Surfynol 61 | Insoluble | — | — | — | — |
| I5 | 3.5 | Surfynol 2502 | 3377 | 5476 | 6.9 | 1.05 | 0.000 |
| I6 | 3.5 | Dow DS-1000 | 3325 | 6235 | 5.6 | 0.89 | 0.000 |
| I7 | 3.5 | Dow DS-1000 | 2029 | 2387 | 12.3 | 2.32 | 0.049 |
| I8 | 3.5 | Surfynols 465 & 61 | 1973 | 4082 | 17.2 | 3.24 | 0.093 |

The experimental results show that an aqueous titanium solution (ATS) comprising a surfactant as described herein can be utilized to successfully titanate a polymerization catalyst. Without intending to be limited by theory, it is believed that the presence of a surfactant of the type described herein helps to prevent undesired "clumping" or agglomeration of the titanium on the silica support during the drying and/or calcination steps. The clumped or agglomerated forms of titanium on the silica support do not provide a desired catalytic function in contrast to a dispersed form of titanium on the silica support that does provide a desired catalytic function and resultant polymer characteristics (e.g., increased melt index). Without intending to be limited by theory, it is believed that the surfactant may function as a ligand to prevent degradation (e.g., hydrolysis) of one or more intermediate titanium compounds (e.g., titanium oxalate) formed during the catalyst preparation methodology (e.g., formation of the ATS, impregnation of the silica support with the ATS, drying the impregnated support, and/or calcining the dried impregnated support to yield a Cr/Si—Ti catalyst).

Additional Disclosure

The following enumerated aspects of the present disclosure are provided as non-limiting examples.

A first aspect which is a method comprising contacting a silica support with a titanium-containing solution to form a titanated silica support, wherein the titanium-containing solution comprises a titanium compound, a solvent, and a surfactant.

A second aspect which is the method of the first aspect, further comprising drying the titanated silica support by heating the titanated silica support to a temperature in a range of from about 50° C. to about 200° C. and maintaining the temperature of the titanated silica support in the range of from about 50° C. to about 200° C. for a time period of from about 0.01 minutes to about 6 hours to form a pre-catalyst.

A third aspect which is the method of the second aspect, further comprising contacting a chromium-containing compound with the silica support, the titanated silica support, the pre-catalyst, or combinations thereof.

A fourth aspect which is the method of the first or the second aspect, wherein the silica support comprises chromium.

A fifth aspect which is the method of the first or the second aspect, wherein the silica support is simultaneously contacted with the titanium-containing solution and a chromium-containing compound.

A sixth aspect which is the method of the fifth aspect, wherein the titanium-containing solution comprises the chromium-containing compound.

A seventh aspect which is the method of the third, the fifth or the sixth aspect, wherein the chromium-containing compound comprises chromium trioxide, chromium acetate, chromium nitrate, chromium sulfate, tertiary butyl chromate, biscyclopentadienyl chromium(II), chromium(III) acetylacetonate, or combinations thereof.

An eighth aspect which is the method of any of the first through the seventh aspects, wherein the solvent is selected from the group consisting of water, alcohol, and combinations thereof.

A ninth aspect which is the method of any of the first through the seventh aspects, wherein the solvent is an aqueous solvent.

A tenth aspect which is the method of the first aspect, wherein the silica support is a hydrogel or xerogel that contains no titanium prior to contact with the titanium-containing solution.

An eleventh aspect which is the method of any of the first through the tenth aspects, wherein the titanium compound comprises a titanium (IV) compound, a titanium (III) compound, titania, or combinations thereof.

A twelfth aspect which is the method of the eleventh aspect, wherein the titanium compound comprises a titanium (IV) compound comprising an alkoxide group.

A thirteenth aspect which is the method of the twelfth aspect, wherein the titanium compound has the formula $Ti(OR)_4$, $TiO(OR)_2$, $Ti(OR)_2(acac)_2$, or $Ti(OR)_2(oxal)$, wherein "acac" is acetylacetonate, "oxal" is oxalate, and each R independently is ethyl, isopropyl, n-propyl, isobutyl, or n-butyl.

A fourteenth aspect which is the method of the eleventh aspect, wherein the titanium (IV) compound comprises $Ti(OH)_4$, $TiO(OH)_2$, $TiO_2$, $TiO(oxalate)_2$, or a combination thereof, and wherein the titanium (III) compound comprises $Ti_2(SO_4)_3$, $Ti(OAc)_3$, $Ti(oxalate)_3$, $Ti(NO_3)_3$, or a combination thereof.

A fifteenth aspect which is the method of any of the first through the fourteenth aspects, wherein the titanium-containing solution further comprises a carboxylate.

A sixteenth aspect which is the method of the fifteenth aspect, wherein the carboxylate comprises a multi carboxylate, an alpha-hydroxy carboxylate, or a combination thereof.

A seventeenth aspect which is the method of the fifteenth aspect, wherein the carboxylate is provided by oxalic acid, citric acid, lactic acid, tartaric acid, gluconic acid, glycolic acid, malonic acid, or combinations thereof.

An eighteenth aspect which is the method of the fifteenth, sixteenth or seventeenth aspect, wherein the aqueous titanium solution comprises an equivalent molar ratio of the carboxylate to the titanium compound in a range of from about 1 to about 4, or greater than or equal to about 1, 2, 3, or 4.

A nineteenth aspect which is the method of the twelfth aspect, wherein the titanium-containing solution further comprises a carboxylate, wherein the carboxylate is provided by oxalic acid, citric acid, lactic acid, tartaric acid, gluconic acid, glycolic acid, malonic acid, or combinations thereof.

A twentieth aspect which is the method of any of the first through the nineteenth aspects, wherein the surfactant comprises a non-ionic surfactant, a cationic surfactant, or combinations thereof.

A twenty-first aspect which is the method of any of the first through the twentieth aspects, wherein the titanium-containing solution comprises from about 1% to about 25%, from about 2% to about 20%, or from about 3% to about 10% of the surfactant, based on the weight of the surfactant and the weight of the titanium solution.

A twenty-second aspect which is the method of any one of the first through the twenty-first aspects, wherein the silica support has a surface area of from about 100 m²/gram to about 1000 m²/gram and a pore volume of from about 1.0 cm³/gram to about 2.5 cm³/gram.

A twenty-third aspect which is the method of any of the third through the twenty-second aspects, further comprising calcining the pre-catalyst by heating the pre-catalyst in a reducing atmosphere to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A twenty-fourth aspect which a method comprising contacting a chrominated silica support with an aqueous titanium solution to form a titanated, chrominated silica support, wherein the aqueous titanium solution comprises water, a titanium compound, a carboxylic acid, and a surfactant, drying the chrominated, titanated silica support by heating the chrominated, titanated silica support to a temperature in a range of from about 50° C. to about 200° C. and maintaining the temperature of the chrominated, titanated silica support in the range of from about 50° C. to about 200° C. for a time period of from about 1 second to about 6 hours, alternatively from about 30 minutes to about 6 hours, to form a pre-catalyst, and calcining the pre-catalyst by heating the pre-catalyst in an oxidizing atmosphere (e.g., in the presence of oxygen) to a temperature in a range of from about 400° C. to about 1000° C. and maintaining the temperature of the pre-catalyst in the range of from about 400° C. to about 1000° C. for a time period of from about 1 minute to about 24 hours to form a catalyst.

A twenty-fifth aspect which is the method of the twenty-fourth aspect, wherein the aqueous titanium solution is prepared by any suitable addition sequence (e.g., simultaneous or sequential), including by not limited to (i) preparing a first solution by combining the carboxylic acid (e.g., oxalic acid, lactic acid, or malonic acid) and water; (ii) adding the titanium compound (e.g., titanium isopropoxide or $TiO_2$) to the first solution to form a second solution, and (iii) adding the surfactant to the second solution to form the aqueous titanium solution.

A twenty-sixth aspect which is the method of the twenty-fourth or the twenty-fifth aspect, further comprising contacting a chromium-containing compound with a silica support to form the chrominated silica support, wherein the chromium-containing compound comprises chromium trioxide, chromium acetate, chromium nitrate, chromium sulfate, tertiary butyl chromate, biscyclopentadienyl chromium (II), chromium(III) acetylacetonate, or combinations thereof.

A twenty-seventh aspect which is a titanated silica support prepared by the method of the first aspect.

A twenty-eighth aspect which is a pre-catalyst prepared by the method of any of the third through the twenty-second aspects.

A twenty-ninth aspect which is a catalyst produced by the method of the twenty-third, the twenty-fourth, the twenty-fifth or the twenty-sixth aspect.

A thirtieth aspect which is the pre-catalyst of the twenty-eighth aspect, wherein an amount of titanium present in the pre-catalyst ranges from about 0.01% to about 10% by total weight of the pre-catalyst and an amount of chromium present in the pre-catalyst ranges from about 0.01% to about 10% by total weight of the pre-catalyst.

A thirty-first aspect which is the catalyst of the twenty-ninth aspect, wherein an amount of titanium present in the catalyst ranges from about 0.01% to about 10% by total weight of the catalyst and an amount of chromium present in the catalyst ranges from about 0.01% to about 10% by total weight of the catalyst.

A thirty-second aspect which is a pre-catalyst comprising a silica support and (a) titanium in an amount ranging from about 0.01% to about 10% by total weight of the pre-catalyst, wherein the titanium is present within a surface layer on the silica support, (b) a carboxylate in an amount ranging from about 5% to about 25% by total weight of the pre-catalyst, and (c) a surfactant in an amount ranging from about 2% to about 20% by total weight of the pre-catalyst.

A thirty-third aspect which is the pre-catalyst of the thirty-second aspect, wherein the carboxylate is provided by oxalic acid, citric acid, lactic acid, tartaric acid, gluconic acid, glycolic acid, or combinations thereof.

A thirty-fourth aspect which is the pre-catalyst of the thirty-second or the thirty-third aspect, wherein the surfactant is selected from the group consisting of nonionic and cationic.

A thirty-fifth aspect which is the pre-catalyst of the thirty-second, thirty-third, or thirty-fourth aspect, further comprising (d) chromium in an amount ranging from about 0.01% to about 10% by total weight of the pre-catalyst.

A thirty-sixth aspect which is the pre-catalyst of the thirty-second, thirty-third, thirty-fourth or the thirty-fifth aspect, wherein the silica support comprises a surface area of from about 100 m$^2$/gram to about 1000 m$^2$/gram and a pore volume of from about 1.0 cm$^3$/gram to about 2.5 cm$^3$/gram.

A thirty-seventh aspect which is the method of any of the first through the twenty-third aspects, wherein the silica support is selected from the group consisting of a silica xerogel, a silica hydrogel, solid silica (e.g., crystalline silicon dioxide), solid silica-alumina, and combinations thereof.

A thirty-eighth aspect which is a method comprising dissolving a titanium compound in an aqueous solution comprising a carboxylate and a surfactant to form an aqueous titanium solution, wherein the carboxylate comprises a multi carboxylate, an alpha-hydroxy carboxylate, or a combination thereof; forming a titanated silica support by contacting a silica support with the aqueous titanium solution to form the titanated support; drying the titanated support by heating the titanated support to a temperature in a range of from about 50° C. to about 200° C. and maintaining the temperature of the titanated support in the range of from about 50° C. to about 200° C. for a time period of from about 0.01 minutes to about 6 hours to form a dried titanated support; and calcining the dried titanated support by heating the dried titanated support to a temperature in a range of from about 400° C. to about 1000° C. and maintaining the temperature of the dried titanated support in the range of from about 400° C. to about 1000° C. for a time period of from about 1 minute to about 24 hours to form a catalyst, wherein the catalyst further comprises chromium incorporated therein via contacting of a chromium-containing compound with the silica support, the titanated support, the dried titanated support, or a combination thereof.

A thirty-ninth aspect which is the method of the thirty-eighth aspect, wherein the titanium compound is a titanium (IV) compound selected from the group consisting of Ti(OH)$_4$, TiO(OH)$_2$, TiO$_2$, TiO(oxalate)$_2$, and combinations thereof, or a titanium (III) compound selected from the group consisting of Ti$_2$(SO$_4$)$_3$, Ti(OAc)$_3$, Ti(oxalate)$_3$, Ti(NO$_3$)$_3$, and combinations thereof, and wherein the carboxylate is provided by oxalic acid, citric acid, lactic acid, tartaric acid, gluconic acid, glycolic acid, malonic acid, or a combination thereof.

A fortieth aspect which is a method of forming a pre-catalyst composition, the method comprising forming a titanated silica support via the use of an aqueous titanium solution formed by dissolving a titanium compound in an aqueous solution comprising a carboxylate and a surfactant, wherein the carboxylate comprises a multi-carboxylate, an alpha-hydroxy carboxylate, or a combination thereof, and drying the titanated support by heating the titanated support to a temperature in a range of from about 50° C. to about 200° C. and maintaining the temperature of the titanated support in the range of from about 50° C. to about 200° C. for a time period of from about 30 minutes to about 6 hours to form a dried titanated support; and wherein chromium is added via contacting (i) a silica support contacted with the aqueous titanium solution to form the titanated support, (ii) the titanated support, (iii) the dried titanated support, or (iv) a combination thereof with a chromium-containing compound to form the pre-catalyst composition.

A forty-first aspect which is the method of the fortieth aspect, wherein the titanium compound is a titanium (IV) compound selected from the group consisting of Ti(OH)$_4$, TiO(OH)$_2$, TiO$_2$, TiO(oxalate)$_2$, and combinations thereof, or a titanium (III) compound selected from the group consisting of Ti$_2$(SO$_4$)$_3$, Ti(OAc)$_3$, Ti(oxalate)$_3$, Ti(NO$_3$)$_3$, and combinations thereof, and wherein the carboxylate is provided by oxalic acid, citric acid, lactic acid, tartaric acid, gluconic acid, glycolic acid, malonic acid, or a combination thereof.

A forty-second aspect which is a method of producing polyethylene, comprising contacting the catalyst of the twenty-ninth aspect with ethylene under conditions suitable for formation of polyethylene; and recovering the polyethylene.

The terms "a", "an", and "the" are intended, unless specifically indicated otherwise, to include plural alternatives, e.g., at least one. Herein, while methods and processes are described in terms of "comprising" various components or steps, the methods and processes can also "consist essentially of" or "consist of" the various components or steps. A particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an aspect of the present disclosure whether or not the statement is explicitly recited.

While various aspects of the present disclosure have been shown and described, modifications thereof can be made by one skilled in the art without departing from the spirit and teachings of the present disclosure. The aspects of the present disclosure described herein are exemplary only and are not intended to be limiting. Many variations and modifications of the present disclosure are possible and are within the scope of the present disclosure. Where numerical ranges or limitations are expressly stated, such express ranges or limitations should be understood to include iterative ranges or limitations of like magnitude falling within the expressly stated ranges or limitations (e.g., "from about 1 to about 10" includes, 2, 3, 4, etc.; "greater than 0.10" includes 0.11, 0.12, 0.13, etc.). Use of the term "optionally" with respect to any element of a claim is intended to mean that the subject element is required, or alternatively, is not required. Both alternatives are intended to be within the scope of the claim.

Use of broader terms such as "comprises", "includes", "having", etc. should be understood to provide support for narrower terms such as "consisting of", "consisting essentially of", "comprised substantially of", etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the aspect of the present disclosure. The discussion of a reference in the present disclosure is not an admission that it is prior art to the present disclosure, especially any reference that may have a publication date after the priority date of this application. The present disclosures of all patents, patent applications, and publications cited herein are hereby incorporated by reference, to the extent that they provide exemplary, procedural or other details supplementary to those set forth herein.

All publications, patent applications, and patents mentioned herein are incorporated by reference in their entirety. In the event of conflict, the present specification, including definitions, is intended to control. With respect to all ranges disclosed herein, such ranges are intended to include any combination of the mentioned upper and lower limits even if the particular combination is not specifically listed.

What is claimed is:

1. A method comprising contacting a silica support with a titanium-containing solution to form a titanated silica support, wherein the titanium-containing solution comprises a titanium compound, a solvent, and a surfactant, wherein the titanium-containing solution has a pH of less than about 5.5, wherein the surfactant comprises a water-insoluble component and a water-soluble component, and wherein the titanium-containing solution comprises from about 30 wt. % of the surfactant, based on a weight of the silica support.

2. The method of claim 1 wherein the silica support is selected from the group consisting of a silica xerogel, a silica hydrogel, solid silica, solid silica-alumina, and a combination thereof.

3. The method of claim 1 wherein the silica support has a surface area in a range of from about 100 m$^2$/gram to about 1000 m$^2$/gram.

4. The method of claim 1 wherein the silica support has a pore volume in a range of from about 1.0 cm$^3$/gram to about 2.5 cm$^3$/gram.

5. The method of claim 1 wherein the silica support has an average particle size in a range of from about 10 microns to about 500 microns.

6. The method of claim 1 wherein the titanium compound is a titanium (IV) compound.

7. The method of claim 1 wherein the titanium compound comprises compounds that have the general formula Ti(OR)$_4$, TiO(OR)$_2$, Ti(OR)$_2$(acac)$_2$, Ti(OR)$_2$(oxal), or a combination thereof, wherein each R is independently ethyl, isopropyl, n-propyl, isobutyl, or n-butyl; "acac" is acetylacetonate; and "oxal" is oxalate.

8. The method of claim 1 wherein the titanium compound comprises a titanium (IV) alkoxide.

9. The method of claim 8 wherein the titanium (IV) alkoxide comprises titanium (IV) ethoxide, titanium (IV) isopropoxide, titanium (IV) n-propoxide, titanium (IV) n-butoxide, titanium (IV) 2-ethylhexoxide, or a combination thereof.

10. The method of claim 1 wherein the titanium compound comprises hydrous titania, titanium hydroxide, titanium dioxide, titanic acid, titanyl sulfate, titanium acetylacetonate, titanium oxyacetylacetonate, or a combination thereof.

11. The method of claim 1 wherein the titanium compound comprises titanium tetrachloride, titanium tetrabromide, titanium (IV) oxychloride, titanium (IV) oxybromide or a combination thereof.

12. The method of claim 1 wherein the titanium compound comprises a titanium alkoxyhalide having the general formula Ti(OR)$_n$Q$_{4-n}$; wherein each R independently is ethyl, isopropyl, n-propyl, isobutyl, or n-butyl; wherein Q may be a fluoride, a chloride, a bromide, an iodide, or a combination thereof; and wherein n may be an integer from 1 to 4.

13. The method of claim 1 wherein the surfactant comprises a non-ionic surfactant, a cationic surfactant, an anionic surfactant, or a combination thereof.

14. The method of claim 13 wherein the nonionic surfactant comprises polyalkoxylates, polyethoxylates, glucosides, a polyethoxylated alcohol, a polyethoxylated mercaptan, or a combination thereof.

15. The method of claim 1 wherein the surfactant comprises alkyl sulfates, aryl sulfates, alkylaryl sulfates, alkyl sulfonates, aryl sulfonates, alkylaryl sulfonates, phosphates of alkali metals, ammonium salts of phosphates, alkylsulfonic acids, sulfosuccinate salts, fatty acid salts, ethoxylated alcohols, amphiphilic copolymers or a combination thereof.

16. The method of claim 1 further comprising contacting a chromium-containing compound with the silica support, the titanated silica support, or a combination thereof.

17. The method of claim 16 wherein the chromium-containing compound comprises chromium trioxide, chromium acetate, chromium nitrate, chromium sulfate, tertiary butyl chromate, biscyclopentadienyl chromium (II), chromium (III) acetylacetonate, or a combination thereof.

18. The method of claim 1 wherein the solvent is selected from the group consisting of water, alcohol, and a combination thereof.

19. A method comprising contacting a silica support with a titanium-containing solution to form a titanated silica support, wherein the titanium-containing solution comprises a titanium compound having the general formula Ti(OR)$_4$, TiO(OR)$_2$, Ti(OR)$_2$(acac)$_2$, Ti(OR)$_2$(oxal), or a combination thereof, wherein each R is independently ethyl, isopropyl, n-propyl, isobutyl, or n-butyl; "acac" is acetylacetonate; and "oxal" is oxalate, a solvent, and a surfactant, wherein the titanium-containing solution has a pH of less than about 5.5, wherein the surfactant comprises a water-insoluble component and a water-soluble component, and wherein the titanium-containing solution comprises from about 10 wt. % to about 30 wt. % of the surfactant, based on a weight of the silica support.

20. The method of claim 19 further comprising contacting a chromium-containing compound with the silica support, the titanated silica support, or combinations thereof wherein the chromium-containing compound comprises chromium trioxide, chromium acetate, chromium nitrate, or a combination thereof.

21. The method of claim 20 wherein the surfactant comprises polyalkoxylates, polyethoxylates, glucosides, a polyethoxylated alcohol, a polyethoxylated mercaptan, or a combination thereof.

* * * * *